United States Patent [19]

Lehmann et al.

[11] Patent Number: 4,897,279

[45] Date of Patent: Jan. 30, 1990

[54] METHOD OF DEPHOSPHOLIPIDATING WHEY

[75] Inventors: Hanno Lehmann; Iloi Wasen, both of Oelde, Fed. Rep. of Germany

[73] Assignee: Westfalia Separator AG, Oelde, Fed. Rep. of Germany

[21] Appl. No.: 295,420

[22] Filed: Jan. 10, 1989

[30] Foreign Application Priority Data

Jan. 11, 1988 [DE] Fed. Rep. of Germany ....... 3800468

[51] Int. Cl.$^4$ ............................ A23C 9/20; A23L 1/29
[52] U.S. Cl. ..................................... 426/583; 426/478; 426/495
[58] Field of Search ......................... 426/583, 478, 495

[56] References Cited

U.S. PATENT DOCUMENTS 3,560,219  2/1971  Attebery ............................ 426/583
4,036,999  7/1977  Grindstaff ......................... 426/583

Primary Examiner—Donald E. Czaja
Assistant Examiner—Helen Pratt
Attorney, Agent, or Firm—Sprung Horn Kramer & Woods

[57] ABSTRACT

A method of dephospholipidating whey to separate the lipoproteins out of it and/or decrease its residual fat content by adding calcium to the whey, heating it and keeping it hot to aggregate the lipoproteins, and then centrifuging it. The pH of the whey is increased before it is heated by adding sodium-hydroxide solution, and the calcium is not added until after the whey is heated.

7 Claims, 1 Drawing Sheet

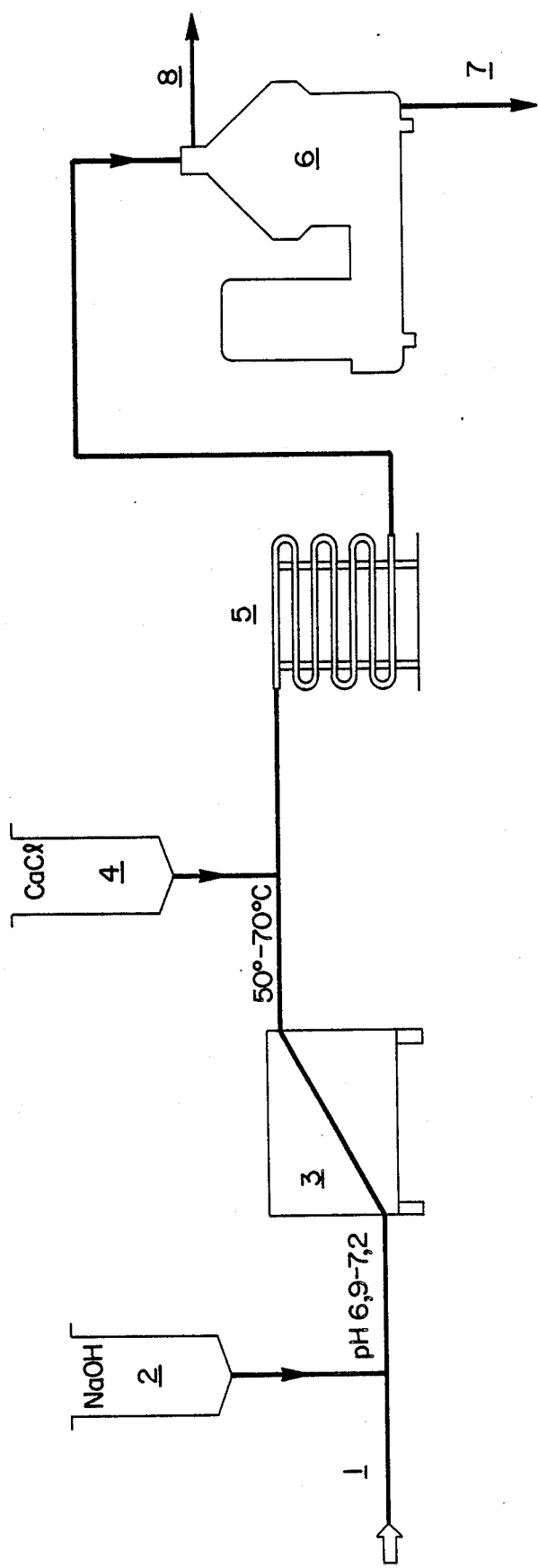

METHOD OF DEPHOSPHOLIPIDATING WHEY

BACKGROUND OF THE INVENTION

The invention concerns a method of dephospholipidating whey to separate the lipoproteins out of it and/or decrease its residual fat content by adding calcium to the whey, heating it and keeping it hot to aggregate the lipoproteins, and then centrifuging it.

The lipoproteins or residual fats in the whey are usually detrimental to further processing and to the quality of the final product.

Dephospholipidating whey involves the separation or harvesting of the lipoproteins and may be carried out with both sweet and sour whey.

The lipoproteins or residual fats in the whey consist of small spherules of fat that cannot be separated and of separable fragments of the fat-spherule membranes, which are rich in phospholipids (lecithin, sphingomyelin, cephalin, etc.).

Whey can be dephospholipidated by microfiltration or by a combination of heat treatment and chemical processing.

The whey should be dephospholipidated to at least 50% with no more than 3% of the protein being lost if the advantages attained in processing the whey further are to justify the expense. A whey-protein concentrate with a high level of protein and a low content of fat, for which there is now a high demand in the foodstuffs industry, can be obtained from whey that has been processed in this way. Even dephospholipidation to 50% can lead to a definitely increased output and to longer periods of operation on the part of a downstream ultrafiltration or reverse-osmosis plant, which can be considered one of the greatest economic advantages.

A method of dephospholipidating sweet whey is known from the periodical Le Lait 647 (Jan.-June 1945), pp. 1-19 for example. Dairy whey is treated with approximately 2.22 g of calcium chloride per liter and then heated to approximately 80° C. in a hot-plate heater. The whey is kept hot for 20 seconds and then cooled, precipitating the lipoproteins. The whey is then decanted for 16 hours to separate the lipoproteins, after which the precipitate is added to a centrifuge. The whey itself can be further processed through filters.

This method turns out to have various drawbacks. First, adding the calcium chloride to the whey before it is heated leads to precipitation of calcium in the heater and clogs it up, so that it must be cleaned relatively often, shortening the plant's periods of operation.

Again, since the large quantities of calcium chloride added to the whey before it is heated can severely corrode the heater, the heating plates have to be made of special materials, which are correspondingly expensive.

Furthermore, on an industrial scale the precipitated solids must be decanted subsequent to the heating process in large containers, which is undesirable for reasons of both space and expenditure. The low decantation temperature of 2° C. also necessitates containers with hollow walls and demands a lot of costly energy to chill the large quantities of material. The whey must be heated again for the subsequent filtration, which also consumes energy.

Finally, the high temperature that occurs when the whey is heated and the large quantity of calcium chloride lead to a protein loss of approximately 16.59%, which is excessive for industrial applications.

SUMMARY OF THE INVENTION

The object of the instant invention is to improve the method of dephospholipidating whey to the extent that the processing plant can be operated with less down time and the processed whey will be higher in quality and obtained less expensively.

This object is attained in accordance with the invention by the improvement wherein the pH of the whey is increased before it is heated by adding sodium-hydroxide solution, and the calcium is not added until after the whey is heated.

Increasing the pH of the whey before it is heated and adding the calcium after the whey is heated not only removes more fat from the whey but also makes it possible to operate for longer periods because no calcium salts will precipitate in the heater. Furthermore, the defatted whey will have a pH that is ideal for further processing.

The pH of the whey can be adjusted to between 6.9 and 7.2. The pH can be adjusted by continuously adding sodium-hydroxide solution.

The concentration of the sodium-hydroxide solution can be 5 to 12%. Preferably, the whey can be heated to at least 50° C. and to no more than 70° C. The whey can be kept hot for 1 to 3 minutes.

From 0.18 to 0.61 grams of calcium per liter can be added. The calcium can be added in the form of calcium chloride. The whey can be added immediately after the period during which it is kept hot to a centrifuge in order to separate the lipoproteins. The centrifuge can be a self-emptying clarifying separator.

Only between 3 and 11.5% of the proteins in the starting whey are lost and do not appear in the dephospholipidated whey when the method in accordance with the invention is employed. The actual loss depends on the desired degree of dephospholipidation, which is, however, always at least 50%. The lower heating temperature and the smaller amount of calcium chloride added at a pH of 6.9 to 7.15 also substantially inhibits corrosion of the downstream equipment.

The continuous-operation self-emptying clarifying separator that separates the precipitated lipoproteins allows a continuous throughput of 18,000 l/h. It has been shown that the method in accordance with the invention allows substantially longer periods of operation and accordingly continuous processing. Furthermore, the method in accordance with the invention and its associated downstream processing can be carried out in-line, meaning that the product does not have to be stored intermediately.

The lower temperature and smaller amounts of added calcium chloride also decrease salt stress on the dephospholipidating whey and the level of chlorine ions by 55 to 23%. Other advantages of the method are a more beneficial pH of 6.2 to 6.4 in the dephospholipidated whey and the potential for using wheys with fat contents of up to 0.06%. This is the type of whey that usually occurs in a dairy during the production of ordinary cheese (Edam and Gouda e.g.) subsequent to clarification and skimming. It has up to now been impossible to employ known methods to process wheys with such high fat contents. The fat content of the starting whey should not of course exceed 0.06% if the degree of dephospholipidation is to be at least 75%. When a whey contains more than 0.06 fat, the proportion of what is called butter fat, which cannot be precipitated out by aggregation, will be too high.

A whey that has not as yet been subjected to any heat treatment is preferably employed with the method. The protein loss will accordingly be less than 11.5% at 85% dephospholipidation.

The method will now be specified with reference to the drawing wherein:

BRIEF DESCRIPTION OF THE DRAWING

The Figure is a schematic representation of the method according to the present invention.

DETAILED DESCRIPTION OF THE INVENTION

Sodium-hydroxide solution (5-12%) is added from a container 2 to fresh chilled whey 1, adjusting the pH of the whey to between 6.9 and 7.2%. The whey is then heated to between 50° and 70° C. in a plate-type heat exchanger 3. Immediately after the whey is heated, between 0.18 and 0.61 g/l of calcium in the form of calcium chloride is added to it from a container 4. After being kept hot for between 1 and 3 minutes while continuously moving in a heat-maintenance section 5, the whey is conveyed to a clarifying separator 6, in which the precipitated lipoproteins are separated. The separated lipoproteins leave separator 6 through a concentrate outlet 7 and the clarified whey leaves it through an outlet 8.

What is claimed is:

1. A method of dephospholipidating whey comprising the steps of: aggregating lipoproteins by initially adjusting the pH of whey with continuously added sodium-hydroxide solution, heating the adjusted pH whey to at least 50° C., adding from 0.18 to 0.61 grams of calcium per liter of whey the heated whey, and keeping the whey hot for no longer than 3 minutes; and thereafter immediately centrifuging the hot whey to separate the lipoproteins.

2. The method as in claim 1, wherein the step of adjusting comprises adjusting the pH of the whey to between 6.9 and 7.2.

3. The method as in claim 1, wherein the concentration of the added sodium-hydroxide solution is 5 to 12%.

4. The method as in claim 1, wherein the whey is heated to not more than 70° C.

5. The method as in claim 1, wherein the whey is kept hot for at least one minute.

6. The method as claim 1, wherein the calcium is added in the form of calcium chloride.

7. The method as in claim 1, wherein the whey is centrifuged in a self-emptying clarifying separator.

* * * * *